(12) United States Patent
Coyle et al.

(10) Patent No.: US 10,061,815 B1
(45) Date of Patent: Aug. 28, 2018

(54) SYSTEMS AND METHODS FOR DISPLAYING SEARCH RESULTS

(71) Applicant: Veritas Technologies LLC, Mountain View, CA (US)

(72) Inventors: Michael Coyle, Los Altos, CA (US); Terence Chang, San Francisco, CA (US); Anil Khadka, Sunnyvale, CA (US); Nelson Wiggins, San Jose, CA (US)

(73) Assignee: Veritas Technologies LLC, Mountain View, CA (US)

( * ) Notice: Subject to any disclaimer, the term of this patent is extended or adjusted under 35 U.S.C. 154(b) by 988 days.

(21) Appl. No.: 14/506,300

(22) Filed: Oct. 3, 2014

(51) Int. Cl.
G06F 17/30 (2006.01)

(52) U.S. Cl.
CPC .... *G06F 17/3053* (2013.01); *G06F 17/30011* (2013.01); *G06F 17/30554* (2013.01)

(58) Field of Classification Search
None
See application file for complete search history.

(56) References Cited

U.S. PATENT DOCUMENTS

| | | | | |
|---|---|---|---|---|
| 8,176,041 B1 * | 5/2012 | Harinarayan | ..... | G06F 17/30646 707/722 |
| 8,620,842 B1 * | 12/2013 | Cormack | ............. | G06N 99/005 706/12 |
| 9,129,036 B2 | 9/2015 | Dexter et al. | | |
| 2008/0091404 A1 * | 4/2008 | Perrella | ................... | G06F 8/436 703/22 |
| 2008/0235210 A1 | 9/2008 | Krishnaprasad et al. | | |
| 2009/0070301 A1 | 3/2009 | McLean et al. | | |

OTHER PUBLICATIONS

"Search returns results that do not match some required keywords", http://community.ebay.com/t5/Search/Search-returns-results-that-do-not-match-some-required-keywords/td-p/2993976, as accessed Feb. 5, 2014, The eBay Community, (Feb. 26, 2013).
"Relativity", http://kcura.com/relativity/, as accessed Feb. 5, 2014, kCura, (Aug. 26, 2009).
Michael Coyle, et al.; Systems and Methods for Expanding Search Results; U.S. Appl. No. 14/229,119, filed Mar. 28, 2014.
Michael Coyle, et al; Systems and Methods for Expanding Search Results; U.S. Appl. No. 14/229,398, filed Mar. 28, 2014.

(Continued)

*Primary Examiner* — Hosain Alam
*Assistant Examiner* — Tuan-Khanh Phan
(74) *Attorney, Agent, or Firm* — FisherBroyles LLP

(57) ABSTRACT

A disclosed computer-implemented method for displaying search results may include (1) receiving a query to search a document database that stores a document family containing a parent document and a child document embedded within the parent document, (2) in response to receiving the search query, identifying (a) an individual relevance score that quantifies the relevance of the parent document to the search query and (b) a family relevance score that quantifies the overall relevance of the entire document family to the search query, and (3) simultaneously depicting both the individual relevance score and the family relevance score in response to the search query. Various other methods, systems, and computer-readable media are also disclosed.

15 Claims, 8 Drawing Sheets

(56) References Cited

OTHER PUBLICATIONS

Michael Coyle, et al; Systems and Methods for Displaying Search Results; U.S. Appl. No. 14/562,038, filed Dec. 5, 2014.
"Autonomy eDiscovery", http://www.ndm.net/archiving/HP-Autonomy/autonomy-ediscovery, as accessed Oct. 9, 2014, (Nov. 12, 2012).
"Nuix", http://www.nuix.com/, as accessed Oct. 9, 2014, (Jan. 7, 2007).
"Data structure", http://en.wikipedia.org/wiki/Data_structure, as accessed Oct. 9, 2014, (Dec. 4, 2003).
"eDiscovery", http://www.autonomy.com/offerings/ediscovery/, as accessed Aug. 28, 2014, Hewlett-Packard Development Company. L.P., (Sep. 22, 2013).
"Enterprise eDiscovery", http://www.nuix.com/enterprise-ediscovery, as accessed Aug. 28, 2014, Nuix, (Oct. 7, 2013).
"Identity provider", http://en.wikipedia.org/wiki/Identity_provider, as accessed Aug. 28, 2014, Wikipedia, (Mar. 15, 2012).
"What does value & 0xff do in Java?", http://stackoverflow.com/questions/11380062/what-does-value-0xff-do-in-java, as accessed Aug. 28, 2014, (Jul. 8, 2012).

\* cited by examiner

SYSTEMS AND METHODS FOR DISPLAYING SEARCH RESULTS

BACKGROUND

When a user performs a search for documents within a database, a search engine may analyze and/or filter the documents within the database to provide the most relevant results. Some documents returned to the user may be part of a family of related documents, such as a file embedded within another file or an email with corresponding email attachments. For example, in an e-discovery platform, users may search a document database for documents related to a specific search query. In response, the e-discovery platform may return specific documents that are related to the search query according to a similarity calculation, as discussed further below.

Traditional methods for providing the results of a document search to a user may include calculating and displaying numerical scores that quantify the relevance of particular documents to the user's search. For example, a search engine may calculate relevance scores that quantify the relevance of individual documents. The search engine may then report the individual relevance scores along with the corresponding documents from the document database. Nevertheless, in cases where the search results contain members of document families, conventional systems for displaying relevance scores may not provide users with a comprehensive assessment of the relevance of all documents and document families within the search results. Accordingly, the instant disclosure identifies a need for improved methods for displaying search results.

SUMMARY

As will be described in greater detail below, the instant disclosure describes various systems and methods for displaying search results by, for example, identifying relevance scores for both a parent document and the document family that includes the parent document. Once identified, both relevance scores may be simultaneously displayed to a user.

In one example, a computer-implemented method for displaying search results may include (1) receiving a query to search a document database that stores a document family containing a parent document and a child document embedded within the parent document, (2) in response to receiving the search query, identifying (a) an individual relevance score that quantifies the relevance of the parent document to the search query and (b) a family relevance score that quantifies the overall relevance of the entire document family to the search query, and (3) simultaneously depicting both the individual relevance score and the family relevance score in response to the search query. In some embodiments, the method may further include, in response to receiving the search query, identifying and depicting a child relevance score that quantifies the relevance of the child document to the search query.

In some examples, the family relevance score may represent the highest individual relevance score of any document within the document family. Alternatively, the family relevance score may represent a combined measure of individual relevance scores for each document within the document family.

In some embodiments, identifying the individual relevance score and the family relevance score may include storing the individual relevance score and the family relevance score in a single variable. In such embodiments, the single variable may be represented by a 16-bit integer and each relevance score may be represented by an 8-bit integer. Additionally, in such embodiments, storing the individual relevance score and the family relevance score in the single variable may include (1) bit-shifting one relevance score eight bits to the left and (2) combining both relevance scores by performing an OR operation on the shifted relevance score and the remaining relevance score. Furthermore, in such embodiments, simultaneously depicting both the individual relevance score and the family relevance score may include retrieving the relevance scores by (1) converting an instance of the 16-bit integer into a byte and (2) bit-shifting an instance of the 16-bit integer eight bits to the right and converting the shifted 16-bit integer into a byte.

In some examples, simultaneously depicting both the individual relevance score and the family relevance score may include displaying a graphic to a user that indicates the individual relevance score and the family relevance score. In these examples, displaying the graphic to the user may include displaying the graphic adjacent to an identifier of the parent document on a user interface that displays the search results of the search query. In addition, in some embodiments, the graphic may include a score bar that represents relevance scores in increasing order along the score bar. In such embodiments, the score bar may display one relevance score as a shaded portion of the score bar and another relevance score as a line across the score bar.

In one embodiment, a system for implementing the above-described method may include (1) a reception module that receives a query to search a document database that stores a document family containing a parent document and a child document embedded within the parent document, (2) an identification module that, in response to receiving the search query, identifies (a) an individual relevance score that quantifies the relevance of the parent document to the search query and (b) a family relevance score that quantifies the overall relevance of the entire document family to the search query, and (3) a depiction module that simultaneously depicts both the individual relevance score and the family relevance score in response to the search query. In addition, the system may include at least one processor that executes the reception module, the identification module, and the depiction module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) receive a query to search a document database that stores a document family containing a parent document and a child document embedded within the parent document, (2) in response to receiving the search query, identify (a) an individual relevance score that quantifies the relevance of the parent document to the search query and (b) a family relevance score that quantifies the overall relevance of the entire document family to the search query, and (3) simultaneously depict both the individual relevance score and the family relevance score in response to the search query.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
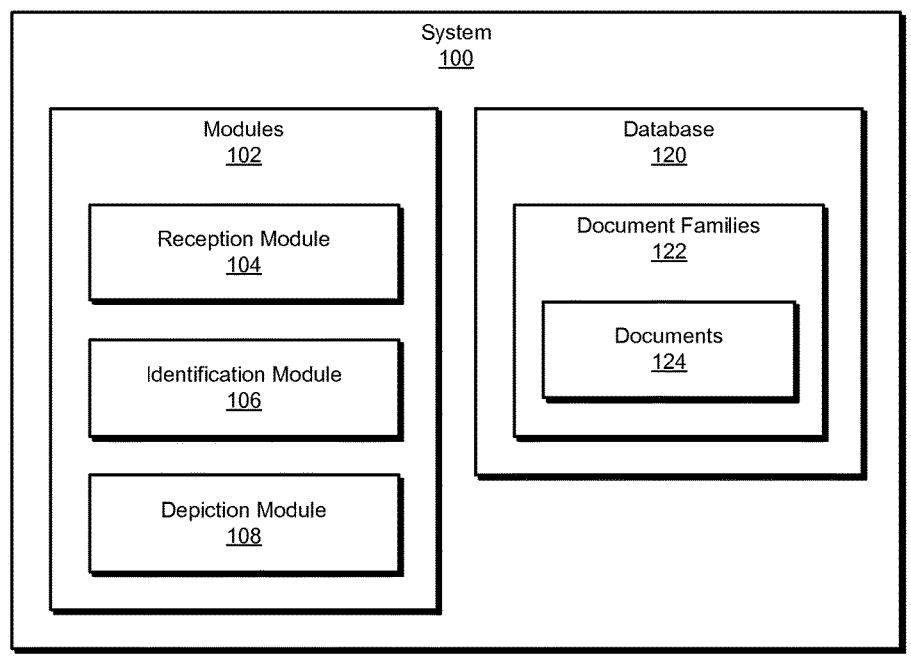
FIG. 1 is a block diagram of an exemplary system for displaying search results.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for displaying search results. As will be explained in greater detail below, by identifying relevance scores that quantify both the overall relevance of an entire document family to a search query and the relevance of individual documents within the document family, the disclosed systems and methods may simultaneously depict multiple relevance scores (e.g., via a graphic displayed to a user). In addition, by storing the relevance scores for an entire document family and a parent document within the document family in a single variable, the disclosed systems and methods may reduce the time and computing resources involved in storing and retrieving multiple relevance scores. As such, the disclosed systems and methods may quickly and efficiently provide users with a comprehensive assessment of the relevance of each document and document family within the results of a document search.

Figure 2:
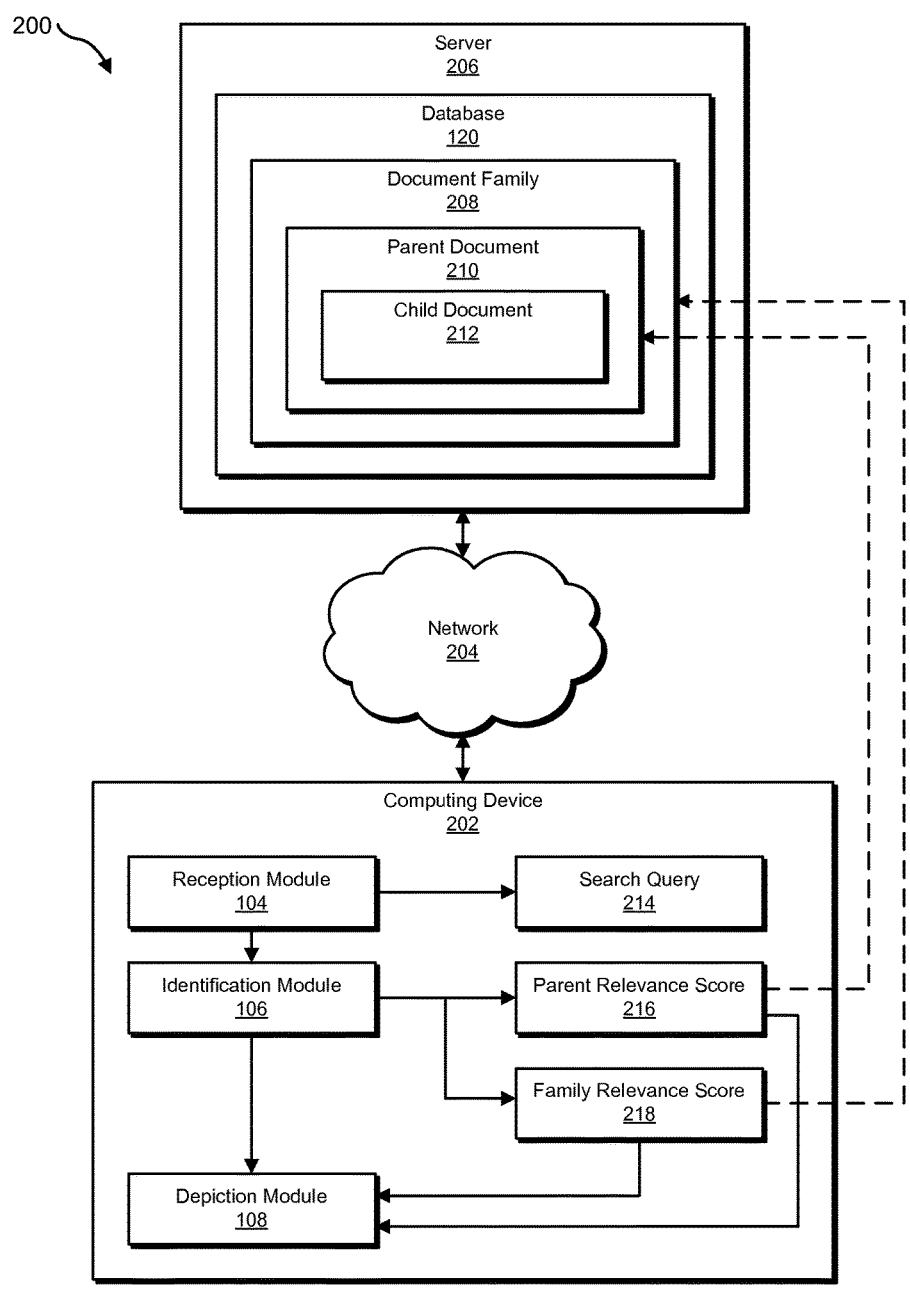
FIG. 2 is a block diagram of an additional exemplary system for displaying search results.

The following will provide, with reference to FIGS. 1 and 2, detailed descriptions of exemplary systems for displaying search results. Detailed descriptions of corresponding computer-implemented methods will also be provided in connection with FIGS. 3-6. In addition, detailed descriptions of an exemplary computing system and network architecture capable of implementing one or more of the embodiments described herein will be provided in connection with FIGS. 7 and 8, respectively.

FIG. 1 is a block diagram of an exemplary system 100 for displaying search results. As illustrated in this figure, exemplary system 100 may include one or more modules 102 for performing one or more tasks. For example, and as will be explained in greater detail below, exemplary system 100 may include a reception module 104 that receives a query to search a document database that stores a document family containing a parent document and a child document embedded within the parent document. Exemplary system 100 may also include an identification module 106 that, in response to receiving the search request, identifies (1) an individual relevance score that quantifies the relevance of the parent document to the search query and (2) a family relevance score that quantifies the overall relevance of the entire document family to the search query.

In addition, and as will be described in greater detail below, exemplary system 100 may include a depiction module 108 that simultaneously depicts both the individual relevance score and the family relevance score in response to the search query. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 710 in FIG. 7, and/or portions of exemplary network architecture 800 in FIG. 8. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store document families 122. In some examples, each of document families 122 may contain one or more of documents 124, which may also be stored in database 120. In general, database 120 may be configured to store any collection of document families and/or independent documents that may be analyzed and displayed to a user in response to the user performing a search.

The term "document family," as used herein, generally refers to any group of files, messages, and/or stored data that are related through attachment (e.g., email attachment), embedding (e.g., content embedded within a parent document), and/or reference. For example, a document family may include an email and attachments distributed via the email. In another example, a document family may include a file and any files embedded within the file. Moreover, as used herein, the term "document" generally refers to any file or data unit that contains readable text for document review purposes, including emails and other readable documents. In addition, as used herein, a "parent document" may represent the top level (or relatively higher level) of a document family that is organized in a hierarchy. In some examples, a parent document may contain, include, or otherwise be associated with one or more child documents that represent lower levels of the hierarchy. As an example, an email may represent a parent document and attachments within the email may represent child documents. Furthermore, in exemplary embodiments, the disclosed systems and methods may operate in the context of a document review and/or e-discovery platform that enables users to search for documents within document families.

Database 120 may represent portions of a single database or computing device or a plurality of databases or computing devices. For example, database 120 may represent a portion of server 206 in FIG. 2, computing system 710 in FIG. 7, and/or portions of exemplary network architecture 800 in FIG. 8. Alternatively, database 120 in FIG. 1 may represent one or more physically separate devices capable of being accessed by a computing device, such as server 206 in FIG. 2, computing system 710 in FIG. 7, and/or portions of exemplary network architecture 800 in FIG. 8.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. In one example, computing device 202 may be programmed with one or more of modules 102 and/or may store all or a portion of the data in database 120. Additionally or alternatively, server 206 may be programmed with one or more of modules 102 and/or may store all or a portion of the data in database 120.

In the example of FIG. 2, modules 102 may reside client-side on computing device 202 in order to facilitate a user of computing device 202 searching for documents within database 120. In this example, database 120 may reside server-side on server 206. In other examples, however, all or a part of modules 102 may reside server-side. Similarly, both server 206 and computing device 202 may be merged into a single machine or computing system.

In one embodiment, one or more of modules 102 from FIG. 1 may, when executed by at least one processor of computing device 202 and/or server 206, enable computing device 202 and/or server 206 to display search results. For example, and as will be described in greater detail below, one or more of modules 102 may cause computing device 202 and/or server 206 to receive a query (e.g., a search query 214) to search a document database (e.g., database 120) that stores a document family (e.g., a document family 208) containing a parent document (e.g., a parent document 210) and a child document (e.g., a child document 212) embedded within parent document 210. In response to receiving search query 214, one or more of modules 102 may cause computing device 202 and/or server 206 to identify (1) an individual relevance score (e.g., a parent relevance score 216) that quantifies the relevance of parent document 210 to search query 214 and (2) a family relevance score (e.g., a family relevance score 218) that quantifies the overall relevance of document family 208 to search query 214. Finally, one or more of modules 102 may cause computing device 202 and/or server 206 to simultaneously depict both parent relevance score 216 and family relevance score 218 in response to search query 214.

In the example of FIG. 2, a user may initiate search query 214 for documents within database 120. In some embodiments, the results of search query 214 may include all or a portion of document family 208 (e.g., including parent document 210). In such embodiments, identifying the search results may include identifying and/or calculating two separate relevance scores that numerically represent (1) the relevance of parent document 210 to search query 214 and (2) the overall relevance of document family 208 to search query 214. After both relevance scores are calculated, the scores may be depicted alongside or as part of the search results. For example, both relevance scores may be simultaneously displayed to the user in a single graphic.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 710 in FIG. 7, or any other suitable computing device.

Server 206 generally represents any type or form of computing device that is capable of storing, processing, managing, producing, and/or displaying search results. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 800 in FIG. 8, or the like. Network 204 may facilitate communication or data transfer using wireless or wired connections. In one embodiment, network 204 may facilitate communication between computing device 202 and server 206.

Figure 3:
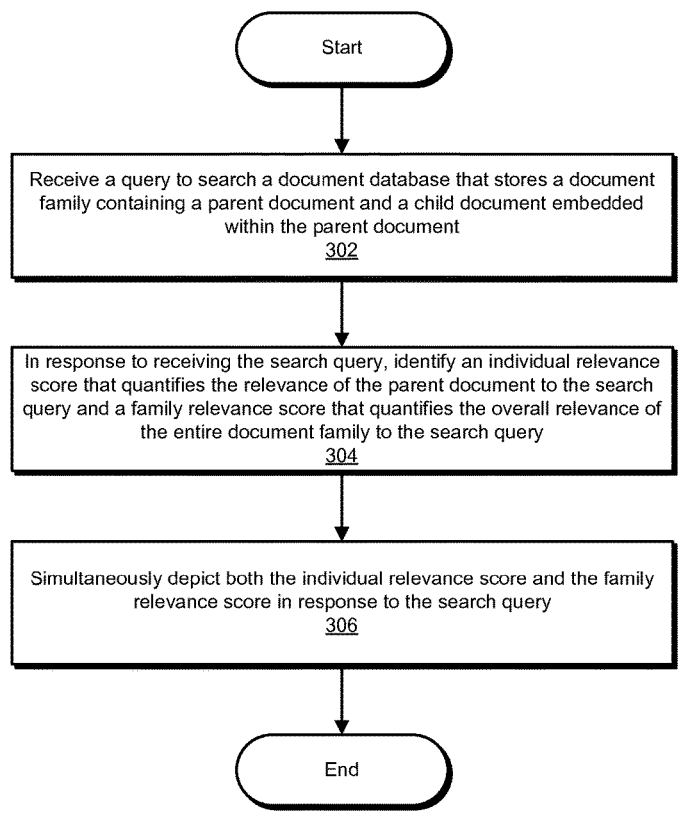
FIG. 3 is a flow diagram of an exemplary method for displaying search results.

FIG. 3 is a flow diagram of an exemplary computer-implemented method 300 for displaying search results. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 710 in FIG. 7, and/or portions of exemplary network architecture 800 in FIG. 8.

As illustrated in FIG. 3, at step 302 one or more of the systems described herein may receive a query to search a document database that stores a document family containing a parent document and a child document embedded within the parent document. For example, reception module 104 may, as part of computing device 202 in FIG. 2, receive search query 214 that contains a request to search document database 120 that stores document family 208 containing parent document 210 and child document 212 embedded within parent document 210.

The systems described herein may receive a query to search a document database in a variety of ways. In some examples, reception module 104 may receive search query 214 at computing device 202. For example, reception module 104 may determine that a user or other entity associated with computing device 202 has initiated search query 214 at computing device 202. Specifically, reception module 104 may determine that a user has directed, via a user interface displayed on computing device 202, a search engine to search database 120 for documents matching a particular set of criteria. Additionally or alternatively, reception module 104 may identify search query 214 at server 206. For example, reception module 104 may identify search query 214 as search query 214 is received by database 120 and/or while search query 214 is completed within database 120.

Returning to FIG. 3, at step 304 one or more of the systems described herein may, in response to receiving the search query, identify (1) an individual relevance score that quantifies the relevance of the parent document to the search query and (2) a family relevance score that quantifies the overall relevance of the entire document family to the search query. For example, identification module 106 may, as part of computing device 202 in FIG. 2, identify parent relevance score 216 and family relevance score 218.

The term "individual relevance score," as used herein, generally refers to any type or form of numerical representation of the degree to which a document corresponds to or is related to a search query. For example, an individual relevance score of a document may represent the frequency with which terms in a search query are found within the document. Specifically, an individual relevance score may indicate the percentage of words within a document that match words within a search query. In some examples, multiple relevance scores may be normalized and/or calculated simultaneously in order to compare the relevance of each document within a database. Additionally or alternatively, an individual relevance score may incorporate factors not directly related to the search query, such as the popularity of a document (e.g., the frequency with which the document is accessed or searched for), the length of the document, the origin of the document (e.g., author or date of creation), etc. An individual relevance score may be calculated using any one or combination of algorithms, such as a term frequency-inverse document frequency statistic, a cosine similarity measure, a PAGERANK algorithm, a vector space model, and/or any additional measurement of similarity or relevance.

In addition, an individual relevance score may be represented in a variety of ways. In one example, an individual relevance score may be represented by a number between zero and one, with zero indicating a document that has no relevance to a particular search query and one indicating a highly relevant document (e.g., the document most relevant to a search query compared to all other documents in a database). In general, an individual relevance score may be represented by a number, fraction, or percentage within any suitable range (e.g., 1-10, 0%-100%, etc.). Moreover, individual relevance scores may be calculated for both parent and child documents. For example, the terms "parent relevance score" and "child relevance score," as used herein, generally refer to the individual relevance scores of a parent document and a child document, respectively.

Additionally, the term "family relevance score," as used herein, generally refers to any type or form of numerical representation of the degree to which an entire document family corresponds to or is related to a search query. In some examples, the family relevance score of a document family may represent the highest individual relevance score of any document within the document family. In other examples, the family relevance score may represent the highest individual relevance score of any child document (e.g., excluding the parent document). Alternatively, a family relevance score may represent a combined measure of the individual relevance scores for each document within a document family. For example, a family relevance score may represent the average of each individual relevance score. In one example, a family relevance score may represent a weighted average of each relevance score (e.g., the individual relevance score of each document may be weighted based on the popularity of the document). In general, the family relevance score may correspond to the output of any business logic, algebraic formula, or other algorithm that takes individual relevance scores as inputs.

The systems described herein may identify an individual relevance score and a family relevance score in a variety of ways. In some examples, identification module 106 may identify parent relevance score 216 and family relevance score 218 by calculating parent relevance score 216 and family relevance score 218. For example, in response to receiving search query 214, identification module 106 may identify documents corresponding to search query 214 within database 120. In order to identify the documents that correspond to search query 214, identification module 106 may calculate relevance scores for each document within database 120. In other examples, identification module 106 may identify parent relevance score 216 and family relevance score 218 by accessing and/or receiving a list of calculated relevance scores. For example, identification module 106 may query database 120 for a list of relevance scores once a search engine for database 120 has completed search query 214.

Once identification module 106 calculates and/or identifies parent relevance score 216 and family relevance score 218, identification module 106 may store parent relevance score 216 and family relevance score 218 in a table or database such that the relevance scores may be accessed later, as will be described in greater detail below. In an exemplary embodiment, identification module 106 may store parent relevance score 216 and/or family relevance score 218 in a hash table.

The term "hash table," as used herein, generally refers to any type or form of data structure or array that associates a label or identifier (e.g., a "key") with a value. For example, a hash table may be created by performing a hash function on a key. The term "hash function," as used herein, generally refers to any type or form of algorithm that converts a portion of data of arbitrary size into a portion of data of fixed size. In some examples, every unique input (or virtually every unique input) into a hash function results in a unique output. As such, a hash function may be used to convert an identifier of a parent document or document family into an index that indicates the location at which one or more relevance scores associated with the parent document and/or document family are stored.

In some examples, identification module 106 may store parent relevance score 216 and family relevance score 218 in a single variable within a table. For example, identification module 106 may combine the numerical representations of parent relevance score 216 and family relevance score 218 into a single number and store the combined number in a single entry or field within a table. Specifically, individual parent score 216 and family relevance score 218 may be represented with a series of bits. Identification module 106 may shift each bit within one relevance score to the left (e.g., by an amount equal to the number of bits in the relevance score) and then combine the shifted relevance score with the remaining relevance score (e.g., using a bitwise OR operation).

Figure 4:
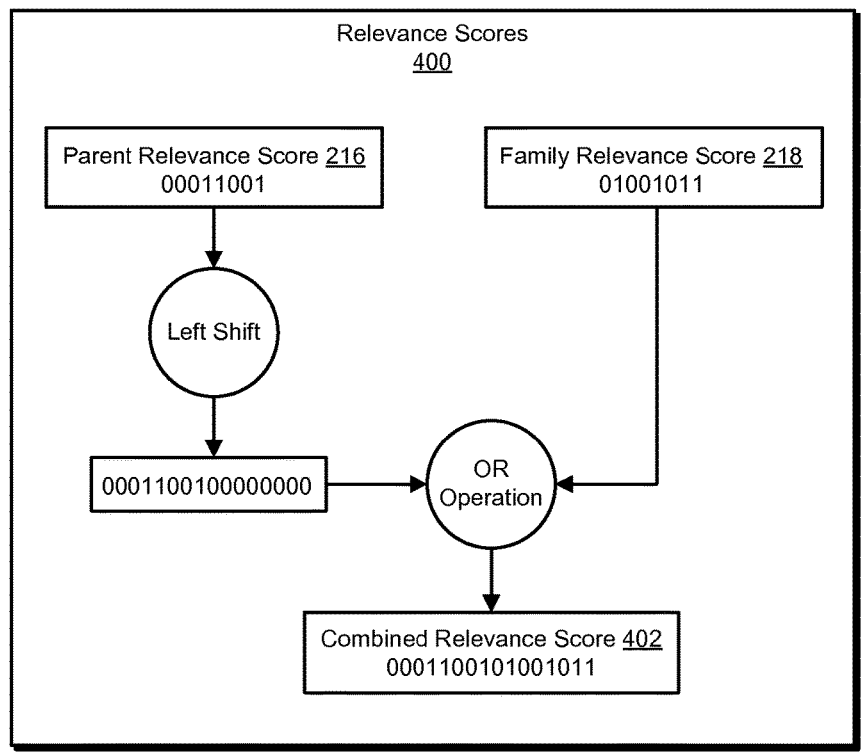
FIG. 4 is an illustration of an exemplary method for storing relevance scores.

As an example, FIG. 4 illustrates relevance scores 400. As shown in FIG. 4, parent relevance score 216 and family relevance score 218 may be described by 8-bit integers and combined into a single 16-bit integer. In this example, parent relevance score 216 may be "00011001" (i.e., 25) and family relevance score 218 may be "01001011" (i.e., 75). In order to combine parent relevance score 216 and family relevance score 218, identification module 106 may shift parent relevance score 216 eight bits to the left. As shown in FIG. 4, shifting parent relevance score 216 eight bits to the left may result in a score of "0001100100000000." Identification module 106 may then combine family relevance score 218 and shifted parent relevance score 216 using a bitwise OR operation to produce a combined relevance score 402 of "0001100101001011." As a result, each byte of combined relevance score 402 may represent a separate relevance score. Notably, in some examples, identification module 106 may convert both relevance scores to the same format (e.g., same number of bits, signed or unsigned, etc.) before combining them. Specifically, identification module 106 may perform a bitwise AND operation on family relevance score 218 and "11111111" (i.e., 255 in decimal and FF in hexadecimal) in order to mask any data included within family relevance score 218 beyond the first byte.

As described in the example above, each family and individual relevance score may be described by an 8-bit integer. As such, each relevance score may fall within the range of –127-127 (i.e., using a signed magnitude representation) or 0-255 (i.e., using an unsigned magnitude representation). In an exemplary embodiment, identification module 106 may set the lowest possible relevance score as 0 (i.e., "00000000" in binary) and the highest possible relevance score as 100 (i.e., "01100100" in binary). In addition, identification module 106 may assign documents with invalid relevance scores (e.g., documents that resulted in errors during relevance score calculations) a relevance score of –1 (i.e., "11111111" in a two's complement representation). In general, identification module 106 may represent relevance scores with any type or length of number and in any format (e.g., floating point numbers, signed or unsigned integers, 8-bit integers, 16-bit integers, etc.).

Furthermore, in some examples, identification module 106 may identify and/or calculate relevance scores for one or more child documents within database 120 in response to search query 214. Similarly to storing parent and family relevance scores, identification module 106 may store each child relevance score in a table or database. Identification module 106 may store each child relevance score within the same table used to store combined parent and family relevance scores, or in a separate table. In an exemplary embodiment, identification module 106 may store each child relevance score as a 16-bit integer in an additional hash table that associates identifiers of child documents with child relevance scores.

In some embodiments, once identification module 106 identifies and/or calculates relevance scores for all or a portion of the documents within database 120, identification module 106 may use the relevance scores to identify one or more documents that correspond to search query 214. In one example, identification module 106 may determine that parent document 210, child document 212, and/or any additional child document within document family 208 corresponds to search query 214 based on the relevance scores stored in a table or database created by identification module 106. Identification module 106 may identify documents that correspond to search query 214 by identifying documents that have a relevance score that satisfies a predetermined threshold (e.g., above 0.7 in a relevance score range of 0-1), by identifying documents that have a relevance score higher than a certain percentage of other documents (e.g., higher than 90% of all documents), or based on any additional metric associated with the calculated relevance scores. Additionally or alternatively, identification module 106 may determine that parent document 210, child document 212, and/or any additional child document within document family 208 corresponds to search query 214 by receiving the results of search query 214 from a search engine or other application that completed search query 214 within database 120.

In addition, identification module 106 may determine that one or more documents correspond to search query 214 based on the documents being contained within a document family that includes at least one document identified as corresponding to search query 214. For example, identification module 106 may include, within the results of search query 214, the entire document families of documents directly relevant to search query 214. In this way, the systems described herein may return to users a more comprehensive list of documents that may be associated with search query 214.

Returning to FIG. 3, at step 306 one or more of the systems described herein may simultaneously depict both the individual relevance score and the family relevance score in response to the search query. For example, depiction module 108 may, as part of computing device 202 in FIG. 2, simultaneously depict both parent relevance score 216 and family relevance score 218 in response to search query 214.

The systems described herein may simultaneously depict the individual relevance score and the family relevance score in a variety of ways. In some examples, depiction module 108 may depict parent relevance score 216 and family relevance score 218 within a graphic displayed to a user that initiated search query 214. The term "graphic," as used herein, generally refers to any type or form of visual indication, icon, mark, pop-up window, or user interface displayed to a user. In some examples, a graphic may display a single relevance score. In other examples, a graphic may simultaneously display multiple relevance scores. In addition, a graphic may directly display the number (e.g., "75") of a relevance score. Additionally or alternatively, a graphic may represent a relevance score with an appropriate mark, line, color, or degree of shading on a box, bar, pie chart, etc.

In some examples, depiction module 108 may display parent relevance score 216 and family relevance score 218 in a graphic adjacent to an identifier of parent document 210 on a user interface that displays the search results of search query 214 to the user. Alternatively, depiction module 108 may display parent relevance score 216 and family relevance score 218 in a graphic, text box, or other notification in an additional window or user interface. In some examples, depiction module 108 may depict parent relevance score 216 and family relevance score 218 in a single graphic. In other examples, depiction module 108 may create multiple graphics that each display a single relevance score.

Figure 5:
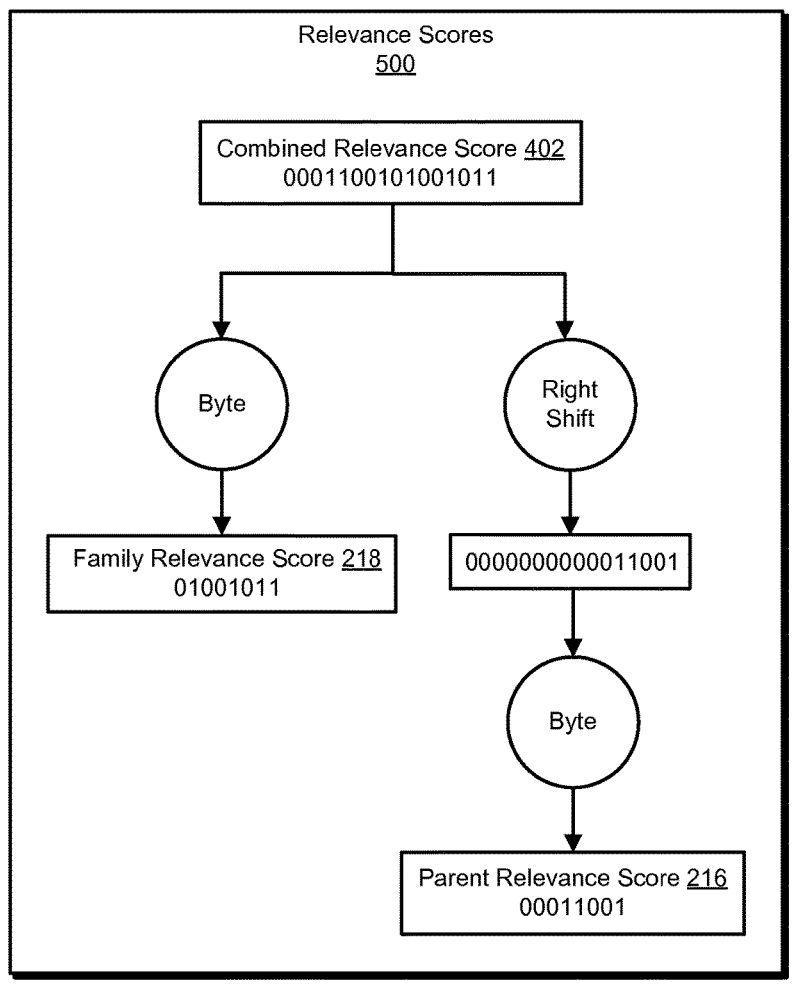
FIG. 5 is an illustration of an exemplary method for retrieving relevance scores.

In some embodiments, depiction module 108 may retrieve instances of parent relevance score 216 and family relevance score 218 from storage (e.g., from within a table or database created by identification module 106). As previously mentioned, in some examples, parent relevance score 216 and family relevance score 218 may be combined and stored in a single variable. In these examples, depiction module 108 may retrieve parent relevance score 216 and family relevance score 218 by accessing portions of the single variable. As an example, FIG. 5 illustrates, within relevance scores 500, retrieving parent relevance score 216 and family relevance score 218 from combined relevance score 402 in FIG. 4. In this example, depiction module 108 may first access (e.g., within a hash table) an instance of combined relevance score 402 (e.g., by identifying the index of combined relevance score 402 within the hash table by performing the hash function on the identifier of parent document 210). Then, depiction module 108 may retrieve an instance of family relevance score 218 by converting combined relevance score 402 into a byte (i.e., by retrieving the first eight bits of combined relevance score 402). Finally, depiction module 108 may retrieve an instance of parent relevance score 216 by shifting combined relevance score 402 eights bits to the right (e.g., to obtain "0000000000011001," as shown in FIG. 5) and converting the shifted combined relevance score into a byte. In some embodiments, combining parent relevance score 216 and family relevance score 218 into a single variable may allow the systems described herein to reduce the storage space required to store the relevance scores, as well as decrease the time and computing resources involved in retrieving the scores.

In some examples, in addition to depicting parent relevance score 216 and family relevance score 218, depiction module 108 may depict the individual relevance score and corresponding family relevance score of any parent and/or child document that identification module 106 determines corresponds to search query 214. In addition, in some embodiments, depiction module 108 may depict the relevance scores of all documents within a document family that contains at least one document that corresponds to search query 214. For example, as previously mentioned, the results of search query 214 may include the entire document families of documents that directly relate to search query 214. In this example, depiction module 108 may also depict the individual relevance scores of each document within the document families, even if the relevance scores of the additional documents are below the threshold used to identify documents that correspond to search query 214.

Figure 6:
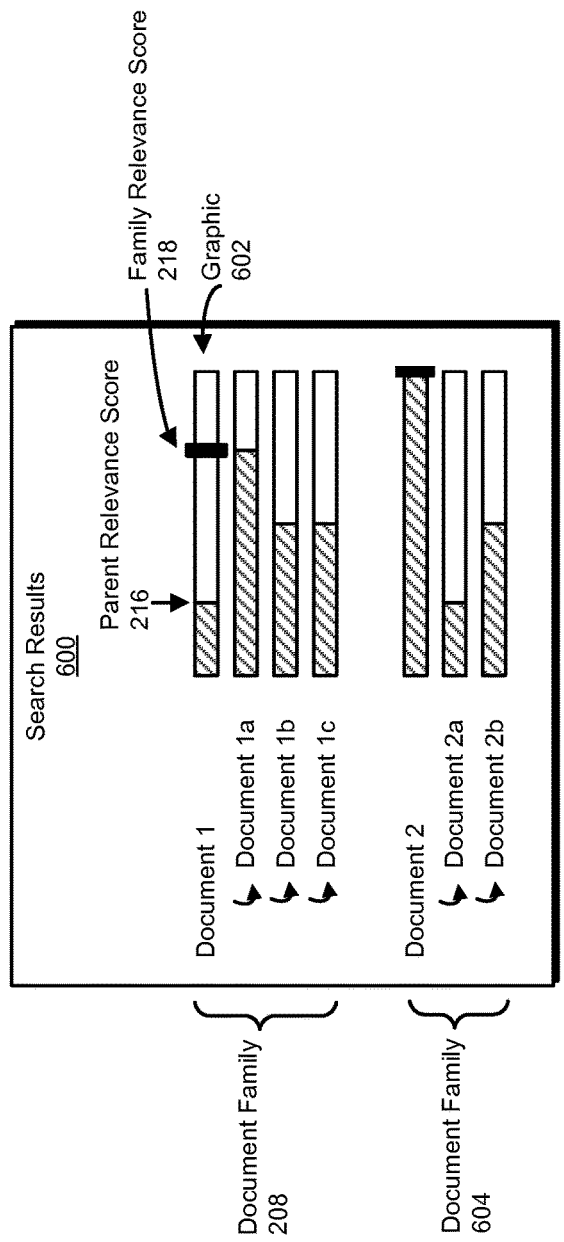
FIG. 6 is an illustration of exemplary relevance scores displayed to a user.

As an example, FIG. 6 illustrates a user interface displaying search results 600. As shown in FIG. 6, search results 600 may include document family 208, which contains document 1 (e.g., parent document 210), document 1a (e.g., child document 212), and two additional child documents (i.e., documents 1b and 1c). In addition, search results 600 may include a document family 604 that contains a parent document (i.e., document 2) and two child documents (i.e., documents 2a and 2b). In this example, depiction module 108 may display each relevance score associated with the documents in search results 600 on a score bar that displays relevance scores in increasing order along the bar. Specifically, depiction module 108 may display, adjacent to an identifier of each document within search results 600, a horizontal bar that represents a relevance score of zero on the left end of the bar and a relevance score of 100 on the right end of the bar. Depiction module 108 may indicate the individual relevance score of each document by shading or coloring a corresponding percentage of each score bar. As an example, depiction module 108 may indicate a relevance score of 75 by shading 75% of the length of a score bar from the left side.

As in the example of FIGS. 4 and 5, parent relevance score 216 may be 25. As such, depiction module 108 may indicate parent relevance score 216 by shading 25% of the score bar adjacent to document 1 (e.g., a graphic 602). In addition, depiction module 108 may shade 75% of the score bar adjacent to document 1a and 50% of the score bars adjacent to documents 1b and 1c to indicate relevance scores of 75, 50, and 50, respectively. In addition, in this example, identification module 106 may determine family relevance score 218 by identifying the highest relevance score of any document within document family 208. Thus, identification module 106 may determine that the relevance score of 75 associated with document 1a represents family relevance score 218. In this example, depiction module 108 may depict family relevance score 218 by displaying a line (e.g., in a different color than the shading used to represent parent relevance score 216) across graphic 602 at 75% down the length of graphic 602. As such, depiction module 108 may simultaneously display parent relevance score 216 and family relevance score 218 to a user via a single graphic.

Similarly, depiction module 108 may display score bars adjacent to each document within document family 604. As shown in FIG. 6, document 2, document 2a, and document 2b may have individual relevance scores of 100, 25, and 50, respectively. In this example, the family relevance score of document family 604 may be 100, as 100 represents the highest individual relevance score of any document within document family 604. As such, depiction module 108 may indicate the family relevance score of document family 604 by displaying a line 100% down the length of the score bar adjacent to document 2.

As described above, by identifying relevance scores that quantify both the overall relevance of an entire document family to a search query and the relevance of individual documents within the document family, the disclosed systems and methods may simultaneously depict multiple relevance scores (e.g., via a graphic displayed to a user). In addition, by storing the relevance scores for an entire document family and a parent document within the document family in a single variable, the disclosed systems and methods may reduce the time and computing resources involved in storing and retrieving multiple relevance scores. As such, the disclosed systems and methods may quickly and efficiently provide users with a comprehensive assessment of the relevance of each document and document family within the results of a document search.

Figure 7:
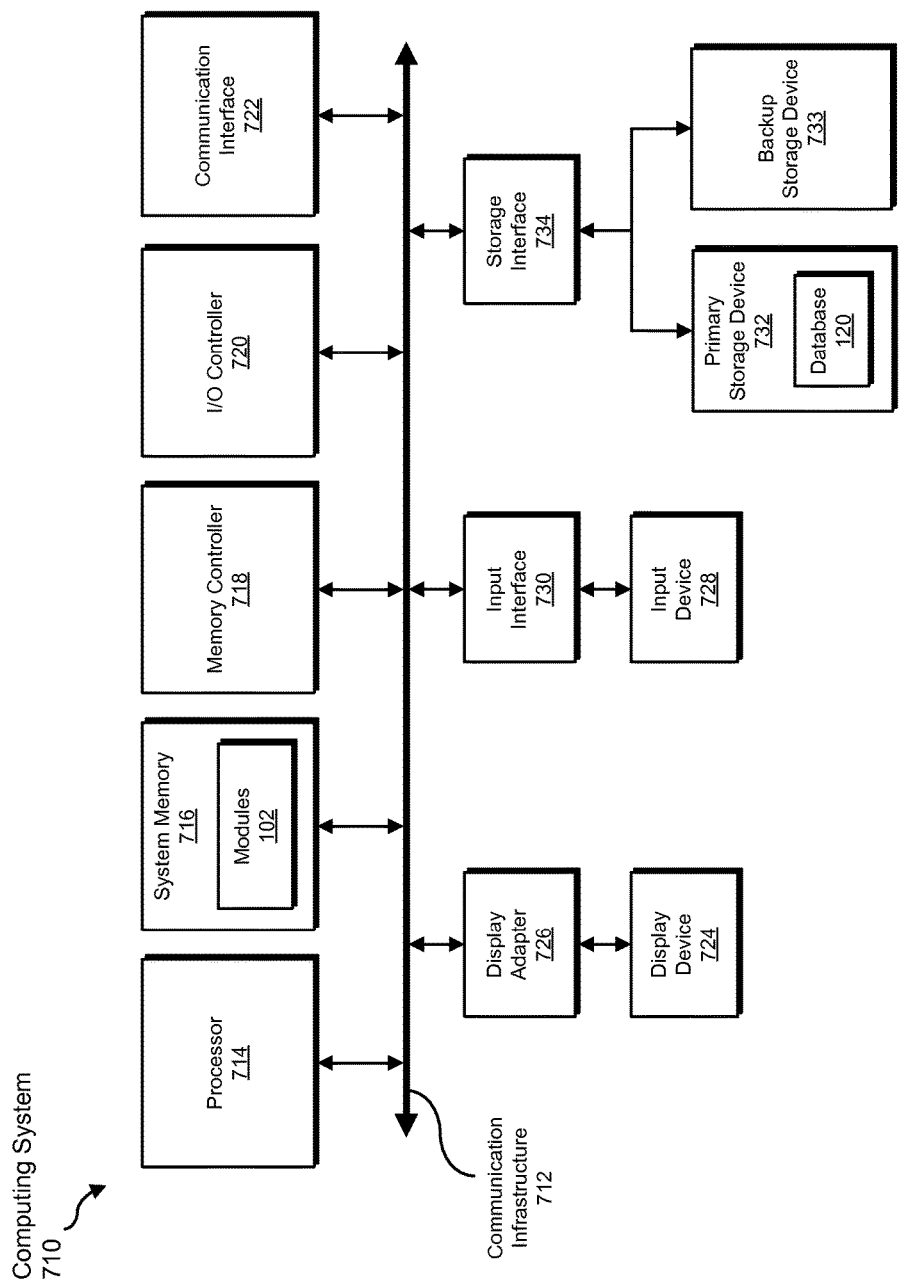
FIG. 7 is a block diagram of an exemplary computing system capable of implementing one or more of the embodiments described and/or illustrated herein.

FIG. 7 is a block diagram of an exemplary computing system 710 capable of implementing one or more of the embodiments described and/or illustrated herein. For example, all or a portion of computing system 710 may perform and/or be a means for performing, either alone or in combination with other elements, one or more of the steps described herein (such as one or more of the steps illustrated in FIG. 3). All or a portion of computing system 710 may also perform and/or be a means for performing any other steps, methods, or processes described and/or illustrated herein.

Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may include at least one processor 714 and a system memory 716.

Processor 714 generally represents any type or form of physical processing unit (e.g., a hardware-implemented central processing unit) capable of processing data or interpreting and executing instructions. In certain embodiments, processor 714 may receive instructions from a software application or module. These instructions may cause processor 714 to perform the functions of one or more of the exemplary embodiments described and/or illustrated herein.

System memory 716 generally represents any type or form of volatile or non-volatile storage device or medium capable of storing data and/or other computer-readable instructions. Examples of system memory 716 include, without limitation, Random Access Memory (RAM), Read Only Memory (ROM), flash memory, or any other suitable memory device. Although not required, in certain embodiments computing system 710 may include both a volatile memory unit (such as, for example, system memory 716) and a non-volatile storage device (such as, for example, primary storage device 732, as described in detail below). In one example, one or more of modules 102 from FIG. 1 may be loaded into system memory 716.

In certain embodiments, exemplary computing system 710 may also include one or more components or elements in addition to processor 714 and system memory 716. For example, as illustrated in FIG. 7, computing system 710 may include a memory controller 718, an Input/Output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an Industry Standard Architecture (ISA), Peripheral Component Interconnect (PCI), PCI Express (PCIe), or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712.

I/O controller 720 generally represents any type or form of module capable of coordinating and/or controlling the input and output functions of a computing device. For example, in certain embodiments I/O controller 720 may control or facilitate transfer of data between one or more elements of computing system 710, such as processor 714, system memory 716, communication interface 722, display adapter 726, input interface 730, and storage interface 734.

Communication interface 722 broadly represents any type or form of communication device or adapter capable of facilitating communication between exemplary computing system 710 and one or more additional devices. For example, in certain embodiments communication interface 722 may facilitate communication between computing system 710 and a private or public network including additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution.

As illustrated in FIG. 7, computing system 710 may also include at least one display device 724 coupled to communication infrastructure 712 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, exemplary computing system 710 may also include at least one input device 728 coupled to communication infrastructure 712 via an input interface 730. Input device 728 generally represents any type or form of input device capable of providing input, either computer or human generated, to exemplary computing system 710. Examples of input device 728 include, without limitation, a keyboard, a pointing device, a speech recognition device, or any other input device.

As illustrated in FIG. 7, exemplary computing system 710 may also include a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a solid state drive, a floppy disk drive, a magnetic tape drive, an optical disk drive, a flash drive, or the like. Storage interface 734 generally represents any type or form of interface or device for transferring data between storage devices 732 and 733 and other components of computing system 710. In one example, database 120 from FIG. 1 may be stored in primary storage device 732.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also include other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7. Computing system 710 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 710. All or a portion of the computer program stored on the computer-readable medium may then be stored in system memory 716 and/or various portions of storage devices 732 and 733. When executed by processor 714, a computer program loaded into computing system 710 may cause processor 714 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 710 may be configured as an Application Specific Integrated Circuit (ASIC) adapted to implement one or more of the exemplary embodiments disclosed herein.

Figure 8:
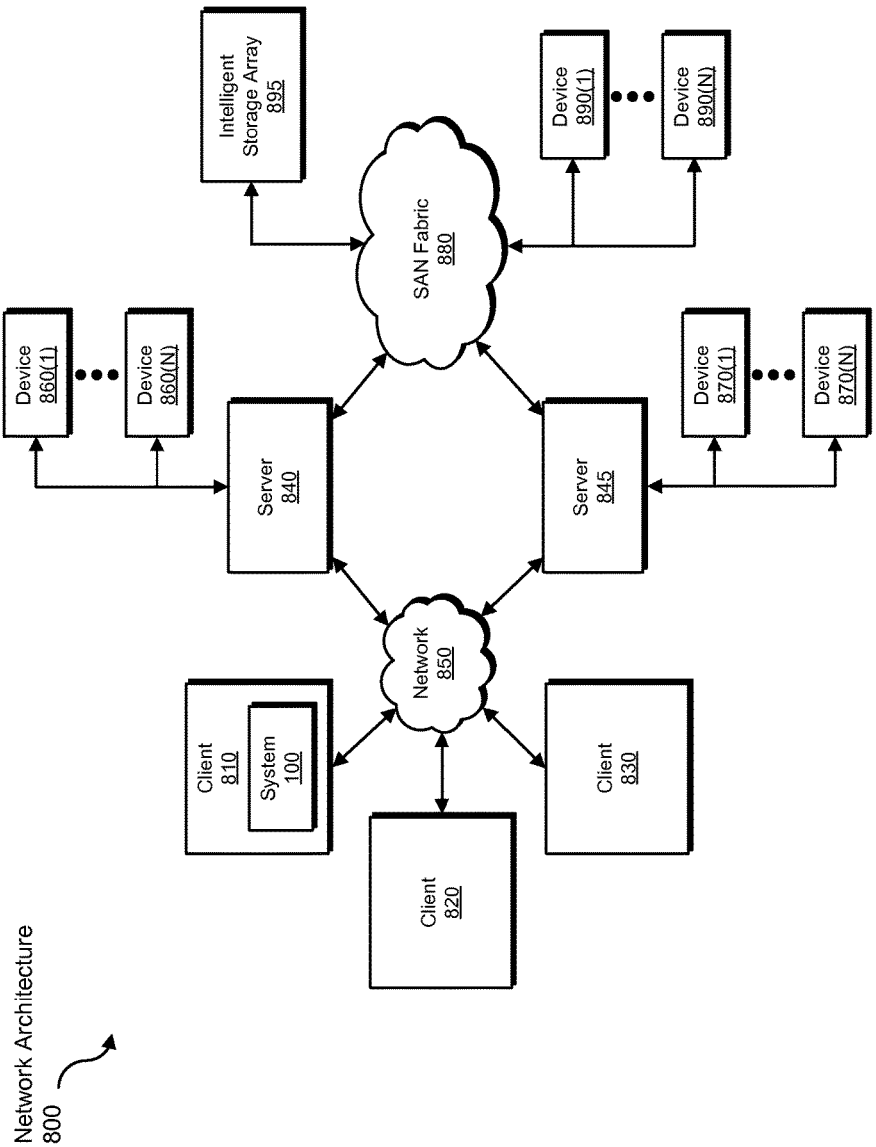
FIG. 8 is a block diagram of an exemplary computing network capable of implementing one or more of the embodiments described and/or illustrated herein.

FIG. 8 is a block diagram of an exemplary network architecture 800 in which client systems 810, 820, and 830 and servers 840 and 845 may be coupled to a network 850. As detailed above, all or a portion of network architecture 800 may perform and/or be a means for performing, either alone or in combination with other elements, one or more of the steps disclosed herein (such as one or more of the steps illustrated in FIG. 3). All or a portion of network architecture 800 may also be used to perform and/or be a means for performing other steps and features set forth in the instant disclosure.

Client systems 810, 820, and 830 generally represent any type or form of computing device or system, such as exemplary computing system 710 in FIG. 7. Similarly, servers 840 and 845 generally represent computing devices or systems, such as application servers or database servers, configured to provide various database services and/or run certain software applications. Network 850 generally represents any telecommunication or computer network including, for example, an intranet, a WAN, a LAN, a PAN, or the Internet. In one example, client systems 810, 820, and/or 830 and/or servers 840 and/or 845 may include all or a portion of system 100 from FIG. 1.

As illustrated in FIG. 8, one or more storage devices 860(1)-(N) may be directly attached to server 840. Similarly, one or more storage devices 870(1)-(N) may be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) may represent Network-Attached Storage (NAS) devices configured to communicate with servers 840 and 845 using various protocols, such as Network File System (NFS), Server Message Block (SMB), or Common Internet File System (CIFS).

Servers 840 and 845 may also be connected to a Storage Area Network (SAN) fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to exemplary computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890(1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the exemplary embodiments disclosed herein may also be encoded as a computer program, stored in server 840, run by server 845, and distributed to client systems 810, 820, and 830 over network 850.

As detailed above, computing system 710 and/or one or more components of network architecture 800 may perform and/or be a means for performing, either alone or in combination with other elements, one or more steps of an exemplary method for displaying search results.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive a request to perform a document search, transform the request, output a result of the transformation to a storage or output device (e.g., a display), use the result of the transformation to display search results, and store the result of the transformation to a memory or storage. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for displaying search results, at least a portion of the method being performed by a computing device comprising at least one processor, the method comprising:
   receiving a query to search a document database that stores at least one document family comprising a parent document and a child document embedded within the parent document;
   in response to receiving the search query:
      identifying an individual relevance score that quantifies the relevance of the parent document to the search query;
      identifying a family relevance score that quantifies the overall relevance of the entire document family to the search query; and
      depicting, adjacent to an identifier of the parent document within a user interface that displays search results of the search query, a score bar that:
         represents relevance scores in increasing order along the score bar; and
         simultaneously displays a value of one relevance score as a shaded portion of the score bar and a value of the other relevance score with a marker on the score bar.

2. The method of claim 1, wherein the family relevance score comprises at least one of:
   the highest individual relevance score of any document within the document family; and
   a combined measure of individual relevance scores for each document within the document family.

3. The method of claim 1, wherein identifying the individual relevance score and the family relevance score comprises storing the individual relevance score and the family relevance score in a single variable.

4. The method of claim 3, wherein:
   the single variable comprises a 16-bit integer; and
   each relevance score is represented by an 8-bit integer.

5. The method of claim 4, wherein storing the individual relevance score and the family relevance score in the single variable comprises:
   bit-shifting one relevance score eight bits to the left; and
   combining both relevance scores by performing an OR operation on the shifted relevance score and the remaining relevance score.

6. The method of claim 5, wherein simultaneously depicting both the individual relevance score and the family relevance score comprises retrieving the relevance scores by:
   converting an instance of the 16-bit integer into a byte; and
   bit-shifting an instance of the 16-bit integer eight bits to the right and converting the shifted 16-bit integer into a byte.

7. The method of claim 1, further comprising, in response to receiving the search query, identifying and depicting a child relevance score that quantifies the relevance of the child document to the search query.

8. A system for displaying search results, the system comprising:
   a reception module, stored in memory, that receives a query to search a document database that stores at least one document family comprising a parent document and a child document embedded within the parent document;
   an identification module, stored in memory, that, in response to receiving the search query, identifies:
      an individual relevance score that quantifies the relevance of the parent document to the search query; and
      a family relevance score that quantifies the overall relevance of the entire document family to the search query;
   a depiction module, stored in memory, that depicts, adjacent to an identifier of the parent document within a user interface that displays search results of the search query, a score bar that:
      represents relevance scores in increasing order along the score bar; and
      simultaneously displays a value of one relevance score as a shaded portion of the score bar and a value of the other relevance score with a marker on the score bar; and
   at least one processor that executes the reception module, the identification module, and the depiction module.

9. The system of claim 8, wherein the family relevance score comprises at least one of:
   the highest individual relevance score of any document within the document family; and
   a combined measure of individual relevance scores for each document within the document family.

10. The system of claim 8, wherein the identification module identifies the individual relevance score and the family relevance score by storing the individual relevance score and the family relevance score in a single variable.

11. The system of claim 10, wherein:
   the single variable comprises a 16-bit integer; and
   each relevance score is represented by an 8-bit integer.

12. The system of claim 11, wherein the identification module stores the individual relevance score and the family relevance score in the single variable by:
   bit-shifting one relevance score eight bits to the left; and
   combining both relevance scores by performing an OR operation on the shifted relevance score and the remaining relevance score.

13. The system of claim 12, wherein the depiction module simultaneously depicts both the individual relevance score and the family relevance score by retrieving the relevance scores by:
   converting an instance of the 16-bit integer into a byte; and
   bit-shifting an instance of the 16-bit integer eight bits to the right and converting the shifted 16-bit integer into a byte.

14. The system of claim 8, wherein:
   in response to receiving the search query, the identification module further identifies a child relevance score that quantifies the relevance of the child document to the search query; and
   the depiction module further depicts the child relevance score.

15. A non-transitory computer-readable medium comprising one or more computer-executable instructions that, when executed by at least one processor of a computing device, cause the computing device to:
  receive a query to search a document database that stores at least one document family comprising a parent document and a child document embedded within the parent document;
  in response to receiving the search query:
    identify an individual relevance score that quantifies the relevance of the parent document to the search query;
    identify a family relevance score that quantifies the overall relevance of the entire document family to the search query; and
    depict, adjacent to an identifier of the parent document within a user interface that displays search results of the search query, a score bar that:
      represents relevance scores in increasing order along the score bar; and
      simultaneously displays a value of one relevance score as a shaded portion of the score bar and a value of the other relevance score with a marker on the score bar.

\* \* \* \* \*